STERETT & REYNOLDS.
Seed Planter.
No. 69,502.
Patented Oct. 1, 1867.
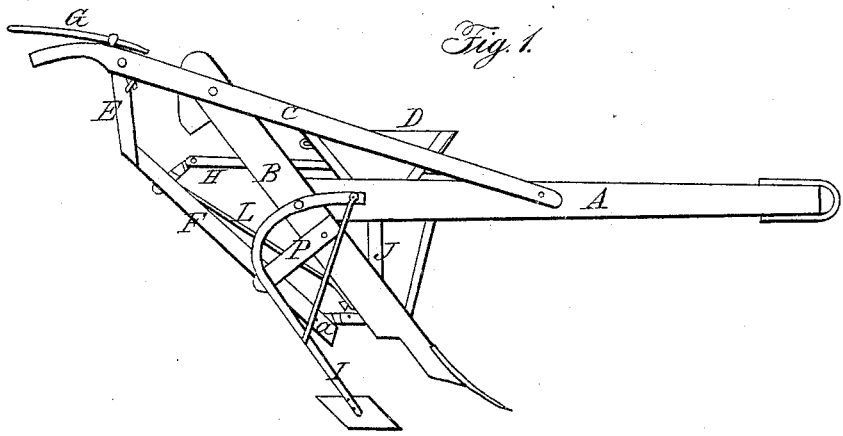
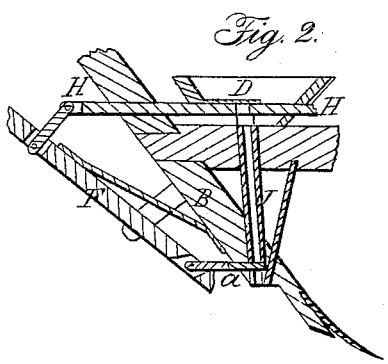
Witnesses:
A. A. Yeatman
A. M. Marr
Inventor:
Joseph T. Sterett
C. M. J. Reynolds
per
Alexander & Mason
attys

United States Patent Office.

JOSEPH F. STERETT AND CHARLES M. J. REYNOLDS, OF OTTUMWA, IOWA.

Letters Patent No. 69,502, dated October 1, 1867.

IMPROVEMENT IN COMBINED CORN-PLANTER AND CULTIVATOR.

*The Schedule referred to in these Letters Patent and making part of the same.*

TO ALL WHOM IT MAY CONCERN:

Be it known that we, JOSEPH F. STERETT and CHARLES M. J. REYNOLDS, of Ottumwa, in the county of Wapello, and in the State of Iowa, have invented certain new and useful Improvements in Combined Corn-Planter and Cultivator; and do hereby declare that the following is a full, clear, and exact description thereof, reference being had to the accompanying drawings, and to the letters of referenc marked thereon. In the annexed drawings, making part of this specification—

A represents the beam of the plough and B the shank at its rear end, to the lower end of which is secure the plough-point. This plough-point is intended for opening a furrow for the seed to be dropped in. Upon the beam, near its rear end, is secured a hopper, D, for containing the seed. J represents a pipe, which connects with the bottom of the hopper, and, passing through the beam and the shank B, deposits the seed in rear of the plough-point. H represents a seed-slide, which passes through the shank B, and then into the hopper D. This slide lies upon the beam, and, playing longitudinally, carries seed from the hopper beneath a suitable cut-off, and deposits it in the pipe J. Two arms, P, project from the shank B at its rear side, and between these arms a bar, F, is pivoted, a little below its centre. The slide H is connected by a link or other suitable device to the upper end of the bar F, and a slide, $a$, is also suitably connected to the bar F, near its lower end. This slide $a$ passes into the pipe J, and serves to catch and hold the seed, when they drop from the hopper, until it is desirable that they should be deposited in the earth. One of the rounds of the plough-handles C is arranged so that it will partially revolve, and an arm, E, and a lever, G, are secured to it. The arm E has its lower end resting against the bar F, and the lever G lies along the handle of the machine, so that the operator, while his hand is upon the handle, can cause the arm E, by means of lever G, to operate upon the bar F, and, by means of said bar, alternately operate the slides H and $a$. A spring, L, which is secured to the back of the shank, moves the bar F in one direction, while the arm E moves it in the other. I I represent bars, which have cultivator-teeth secured to their lower end for covering the grain. These bars are secured to the shank and beam, and their teeth drag through the earth in rear of the point, which opens the furrow for the seed. The operator very readily discharges the grain from the hopper while the machine is in motion by simply bearing down the lever G, and can plant corn either in check-rows or in drills, as he may desire.

What we claim as new, and desire to secure by Letters Patent, is—

The arrangement of the hopper D upon the beam, with the pipe J, slides H and $a$, bar F, and the round of the handles, with its lever G and arm E, the several parts being used and operating as and for the purpose set forth.

In testimony that we claim the foregoing we have hereunto set our hands this 24th day of July, 1867.

JOSEPH F. STERETT,
CHARLES M. J. REYNOLDS.

Witnesses:
D. S. BIGHAM,
T. BIGHAM.